United States Patent [19]

Clancey et al.

[11] Patent Number: 5,125,236

[45] Date of Patent: Jun. 30, 1992

[54] COMBINED GENERATOR SET AND AIR CONDITIONING COMPRESSOR DRIVE SYSTEM

[75] Inventors: Stephen M. Clancey, Moundview; David A. Overland, Cedar; Deborah A. Klinkert, St. Louis Park; Mark S. Lent, Golden Valley; Paul H. Plahn, Maple Grove, all of Minn.

[73] Assignee: Onan Corporation, Minneapolis, Minn.

[21] Appl. No.: 766,902

[22] Filed: Sep. 26, 1991

Related U.S. Application Data

[63] Continuation of Ser. No. 587,642, Sep. 29, 1990, abandoned, which is a continuation of Ser. No. 407,810, Sep. 15, 1989, abandoned.

[51] Int. Cl.$^5$ .............................. F25B 27/00
[52] U.S. Cl. .......................... 62/115; 62/236; 62/239
[58] Field of Search ............. 62/236, 237, 239, 244, 62/323.1, 323.4; 290/4 R, 4 D; 307/149, 150

[56] References Cited

U.S. PATENT DOCUMENTS

| 2,251,376 | 8/1941 | Ross | 62/323.4 |
|---|---|---|---|
| 2,286,316 | 6/1942 | Snook | 62/205 |
| 2,286,961 | 6/1942 | Hanson | 62/323.1 |
| 2,311,622 | 2/1943 | Alexander et al. | 62/205 |
| 2,497,398 | 4/1949 | Miller | 62/236 X |
| 2,962,873 | 12/1960 | Anderson | 62/236 X |
| 2,972,056 | 2/1961 | Park et al. | 290/4 R X |
| 3,230,381 | 1/1966 | Grinnell et al. | 290/4 R |
| 3,941,012 | 3/1976 | Mayer | 62/236 X |
| 4,551,986 | 11/1985 | Anderson et al. | 62/239 |
| 4,697,090 | 9/1987 | Baker et al. | 290/4 R |
| 4,910,414 | 3/1990 | Krebs | 290/4 D X |

*Primary Examiner*—William E. Tapolcai
*Attorney, Agent, or Firm*—Merchant, Gould, Smith, Edell, Welter & Schmidt

[57] ABSTRACT

A combined generator set and air conditioning compressor drive system is disclosed for use in a mobile vehicle. The disclosed device includes an auxiliary engine, a compressor, and a motor-generator. When an external source of electricity is unavailable, the motor-generator is shaft driven by the auxiliary engine and operated as a generator to provide electricity to the vehicle. The compressor is also shaft driven. When an external source of electricity is available, the motor-generator operates as a motor so as to drive the compressor.

15 Claims, 6 Drawing Sheets

COMBINED GENERATOR SET AND AIR CONDITIONING COMPRESSOR DRIVE SYSTEM

This is a continuation of U.S. patent application Ser. No. 07/587,642, filed Sep. 24, 1990, abandoned which is a continuation of U.S. patent application Ser. No. 07/407,810, filed Sep. 15, 1989, abandoned.

FIELD OF THE INVENTION

The present invention relates to an apparatus for cooling air and providing electrical energy for a mobile vehicle. More particularly, the present invention relates to a combined generator set and air conditioning or refrigeration compressor for use in a mobile vehicle, using a motor-generator which is mechanically driven by an auxiliary engine.

BACKGROUND OF THE INVENTION

Air conditioning and refrigeration systems for mobile vehicles such as conversion vans, recreational vehicles (RVs), buses, or trucks are known in the art. Typically, a generator set is used to provide a source of electrical power to various electrical systems or appliances within the vehicle, either to relieve the primary vehicle engine of the burden of powering these systems, or during times when the primary vehicle engine is not operating. Generator sets typically consist of an auxiliary engine and a generator or alternator. The various electrical systems of the vehicle, such as an electrically operated air conditioner, can then be powered by the generator set even when the vehicle engine is not operating. If an external source of electricity is available such as at an RV camp site, then electrical appliances including the air conditioner may be powered directly without the need to run either the vehicle engine or the auxiliary engine.

There are several drawbacks to this arrangement. An electrical air conditioning compressor is powered by electricity which must be generated by converting mechanical energy of the auxiliary engine into electrical energy for the compressor, which has a motor to convert the electrical energy back into mechanical energy. These multiple conversions represent a loss of efficiency in the system. Efficiency loss requires that the auxiliary engine and the generator have a larger capacity than would otherwise be necessary, and results in increased heat generation and reduced reliability. Increased capacity in the engine and the generator also adds to the cost and leads to a physically larger generator set, which may limit installation options. For example, it may be desired to install a generator set and air conditioner in the storage area of an RV. An excessively large generator set may prevent such installation due to a lack of available space, and may also reduce the amount of storage space available.

If, however, a mechanically driven compressor is used to avoid the multiple energy conversions, then a motor must be provided so as to allow the air conditioner to be powered from an external source of electricity. This also increases the size, increases the number of components, and again reduces reliability of the system.

It is clear that there has existed a long and unfilled need in the prior art for an air cooling system which reduces the number of components required, makes efficient use of the sources of power available, and is small enough to be installed in tight locations such as the available space in an RV. The present invention solves these and other shortcomings of the techniques known in the prior art.

SUMMARY OF THE INVENTION

Accordingly, it is an object of one embodiment of the present invention to provide an efficient air cooling system for use in a mobile vehicle. It is also an object of one embodiment of the present invention to provide an air cooling system for a mobile vehicle that uses a minimum of components, and reduces the amount of physical space required in comparison to prior art devices.

In order to achieve the foregoing objects, an air cooling system for use in a motor vehicle is disclosed, comprising an engine; a motor-generator capable of functioning as a motor when connected to an external supply of electricity and as a generator when mechanically driven, the motor-generator being connected to the engine so as to be mechanically driven by the engine; means for connecting the motor-generator to an external electrical supply; and a compressor connected to and mechanically driven by the motor-generator.

These and various other advantages and features of novelty which characterize the invention are pointed out with particularity in the annexed claims which form a part of this disclosure. However, for a better understanding of the invention, its advantages, and the objects obtained by its use, reference should be made to the drawings which also form a part of this disclosure, and to the accompanying descriptive matter in which there is illustrated and described a preferred embodiment of the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
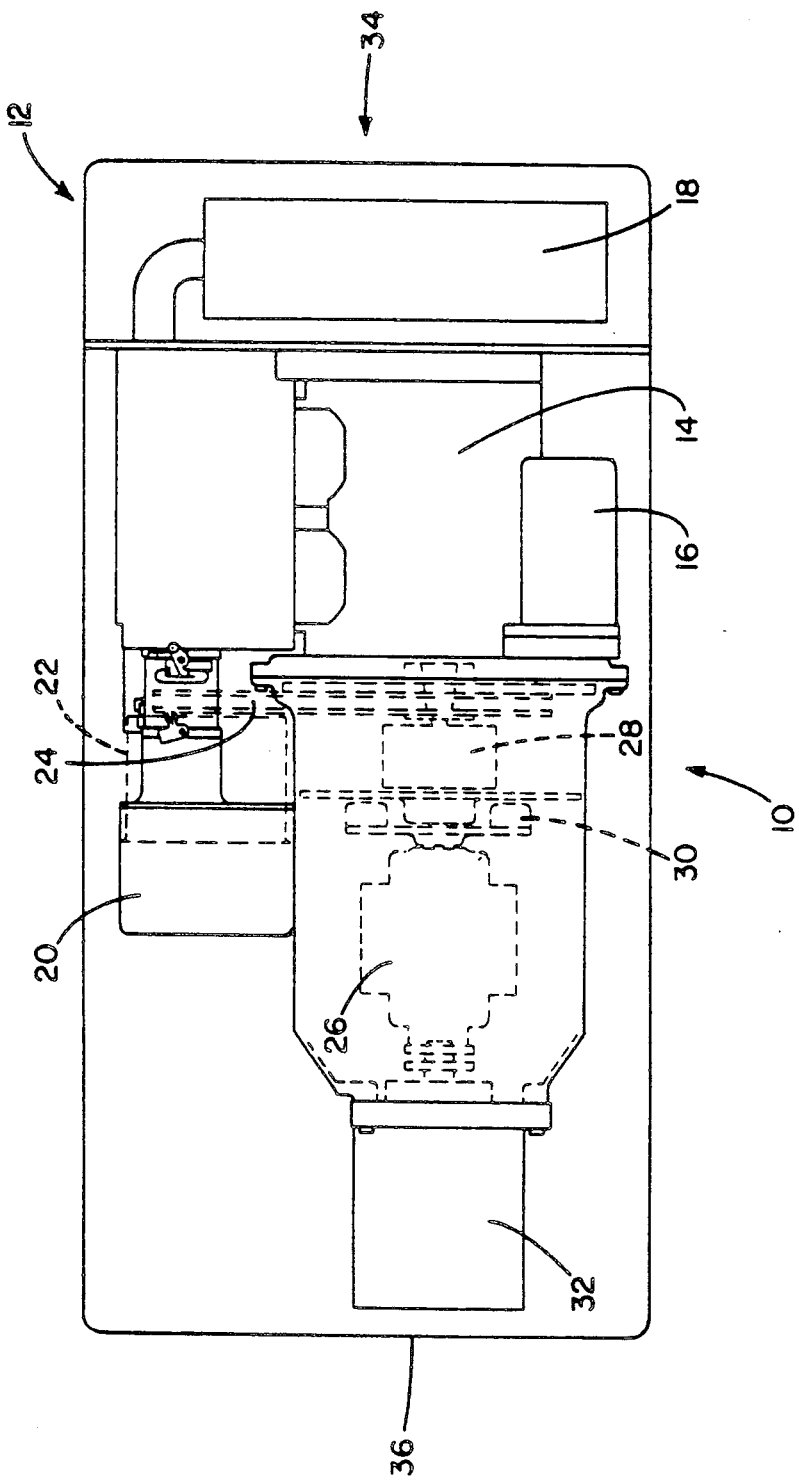
FIG. 1 shows a combined generator set and compressor according to a preferred embodiment of the present invention.

With reference to the drawings, and particularly to FIG. 1, a combined generator set and air conditioning compressor 10 is shown according to a preferred embodiment of the present invention. The components are mounted in a suitable enclosure 12, which contains appropriate air flow vents (not shown). An example of typical use for such a device would be in an RV, where the generator set is used to provide electrical power to run appliances during times when external sources of electricity are either unavailable or inconvenient.

The generator set consists of a conventional internal combustion engine 14 with a starter 16, a muffler 18, and a carburetor and air filter 20. An axial flow fan 22 cools the engine 14. The fan 22 is driven by a belt 24 which is in turn driven by the drive shaft of engine 14.

Figure 5:
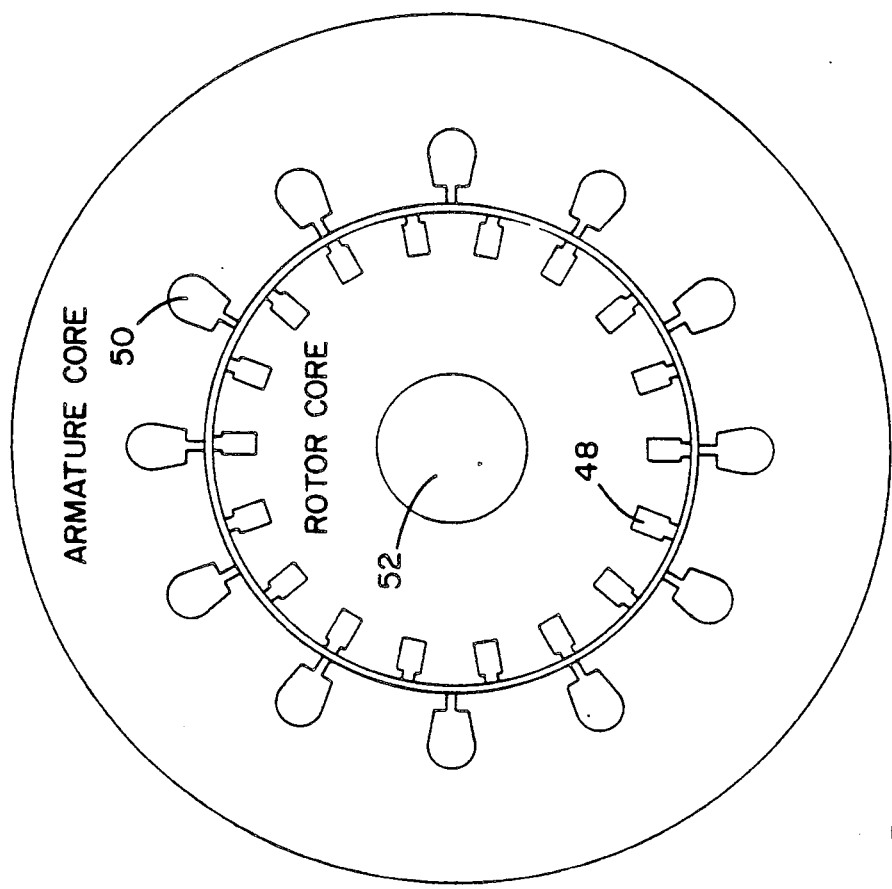
FIG. 5 shows a cross section of a typical induction machine for use as a motor-generator according to an embodiment of the present invention.
Figure 6:
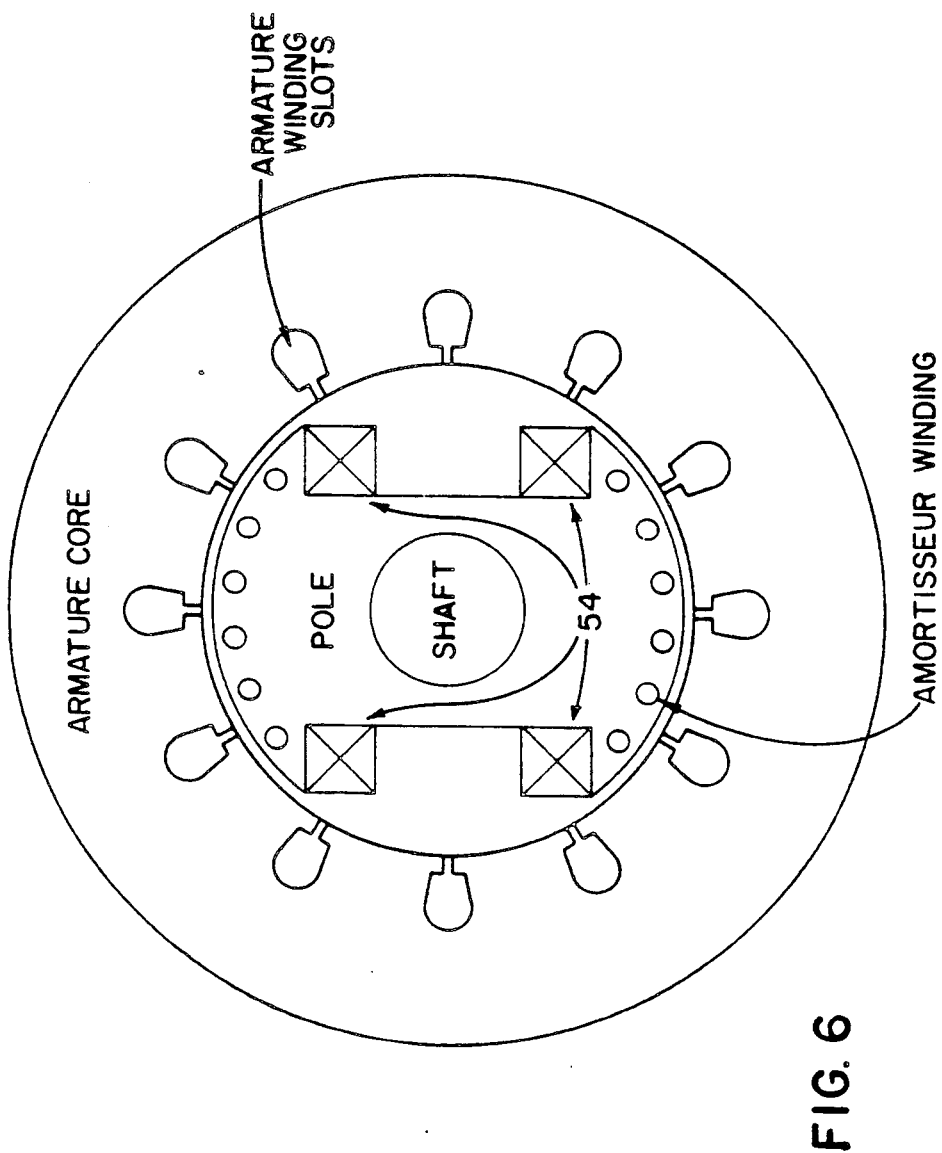
FIG. 6 shows a cross section of a typical synchronous machine for use as a motor-generator according to an embodiment of the present invention.

A motor-generator 26, preferably according to an embodiment shown in FIGS. 5–6, is mechanically driven by engine 14 through clutch 28. A fan 30 is provided to cool the motor-generator 26. An air conditioning compressor 32 is mechanically driven by motor-generator 26.

A combined generator set and compressor built according to FIG. 1 locates the most heat-producing components toward the right side 34 of the generator set 10, and the least heat-producing components near the left side 36. With the resulting temperature gradient, optimal cooling of the engine 14 and the motor-generator 26 is accomplished when cooling fans 22 and 30 blow air from left to right. Engine cooling fan 22 pushes cool air from the left side toward the hot engine 14, while motor-generator cooling fan 30 pulls cool air from the left side over the motor-generator, cooling it in the process.

The combined generator set and compressor of FIG. 1 operates in two different modes, depending upon whether an external source of electrical power is available. If external power is available, engine 14 does not run, and motor-generator 26 is operated as a motor, with clutch 28 disengaging motor-generator 26 and engine 14 from each other. Motor-generator 26 drives compressor 32. If external power is not available, then engine 14 is started, clutch 28 engages engine 14 with motor-generator 26, and motor-generator 26 generates electricity. In the example shown in FIG. 1, compressor 32 is mechanically driven through its shaft connection to motor-generator 26. Compressor 32 may in the alternative be mechanically driven by a belt connected between the shafts of the compressor 32 and the motor-generator 26. A belt driven compressor is technically simpler and affords more flexibility in physically locating the compressor 32 relative to the motor-generator 26, but is less efficient than a shaft driven compressor. The decision between a belt drive, a shaft drive, or some other method depends upon the specific embodiment contemplated.

In this embodiment, the compressor 32 is a 100% unloading compressor, meaning that if air conditioning is not desired, the compressor does not load down the motor-generator or the engine, whichever is providing the motive power.

Those skilled in the art will recognize that certain modifications can be made without departing from the scope of the invention. For example, the compressor may be used in a refrigerator or freezer rather than an air conditioner, or multiple compressors may be present for use in multiple refrigeration systems. In addition, various mechanical drive connections between the engine, the motor-generator, and the compressor may be used, including shaft drive and belt drive connections.

Figure 2:
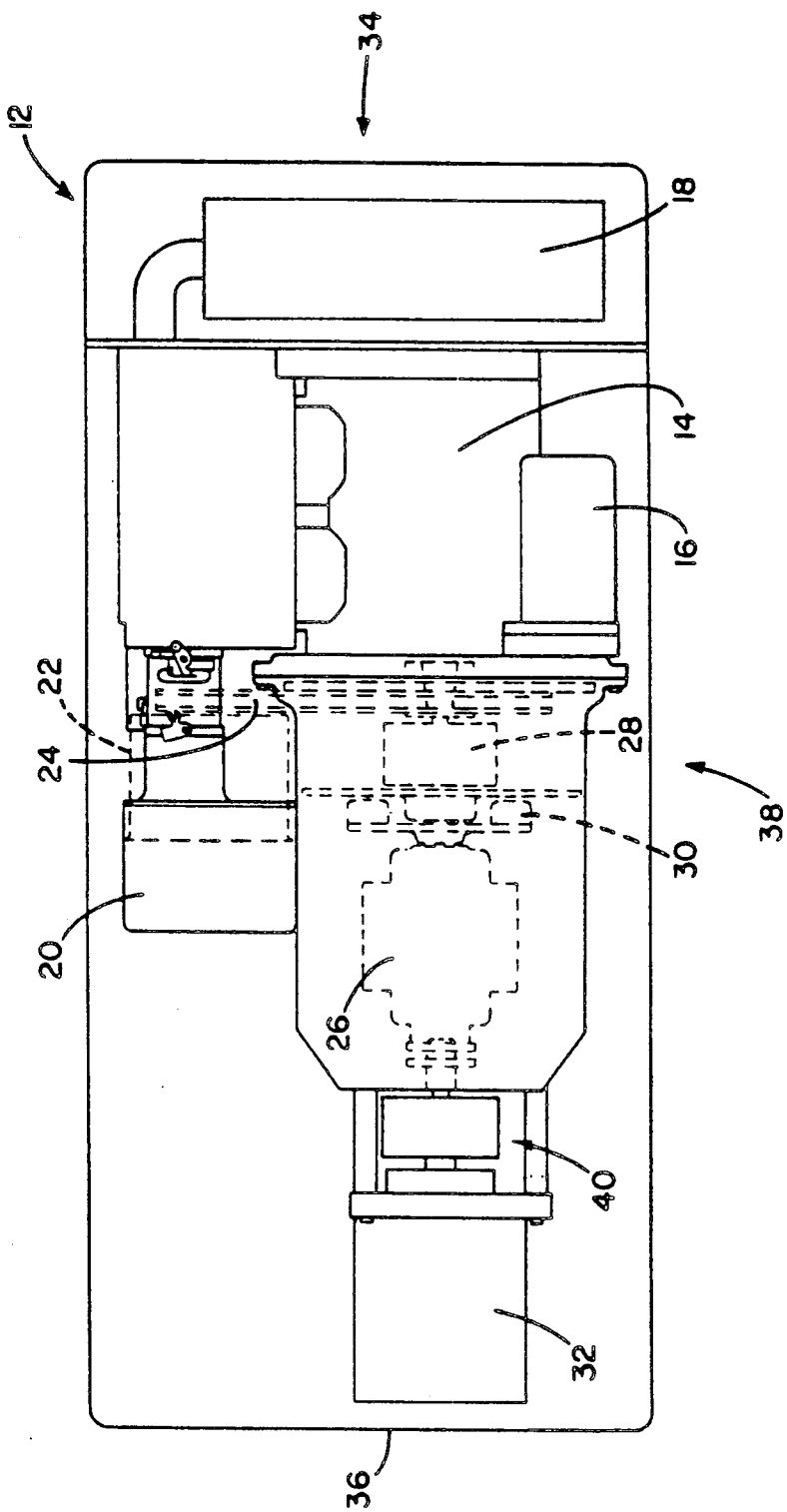
FIG. 2 shows a combined generator set and compressor according to an alternate embodiment of the present invention.

Referring now to FIG. 2, an alternate embodiment of a combined generator set and compressor 38 is shown. This embodiment is identical to that shown in FIG. 1, except that the compressor 32 is not a 100% unloading compressor. Thus in order to avoid the loading of the motor-generator 26 or engine 14 by the compressor 32 when compressor operation is not desired, a clutch 40 is provided to disengage the compressor 32 from the motor-generator 26.

Figure 3:
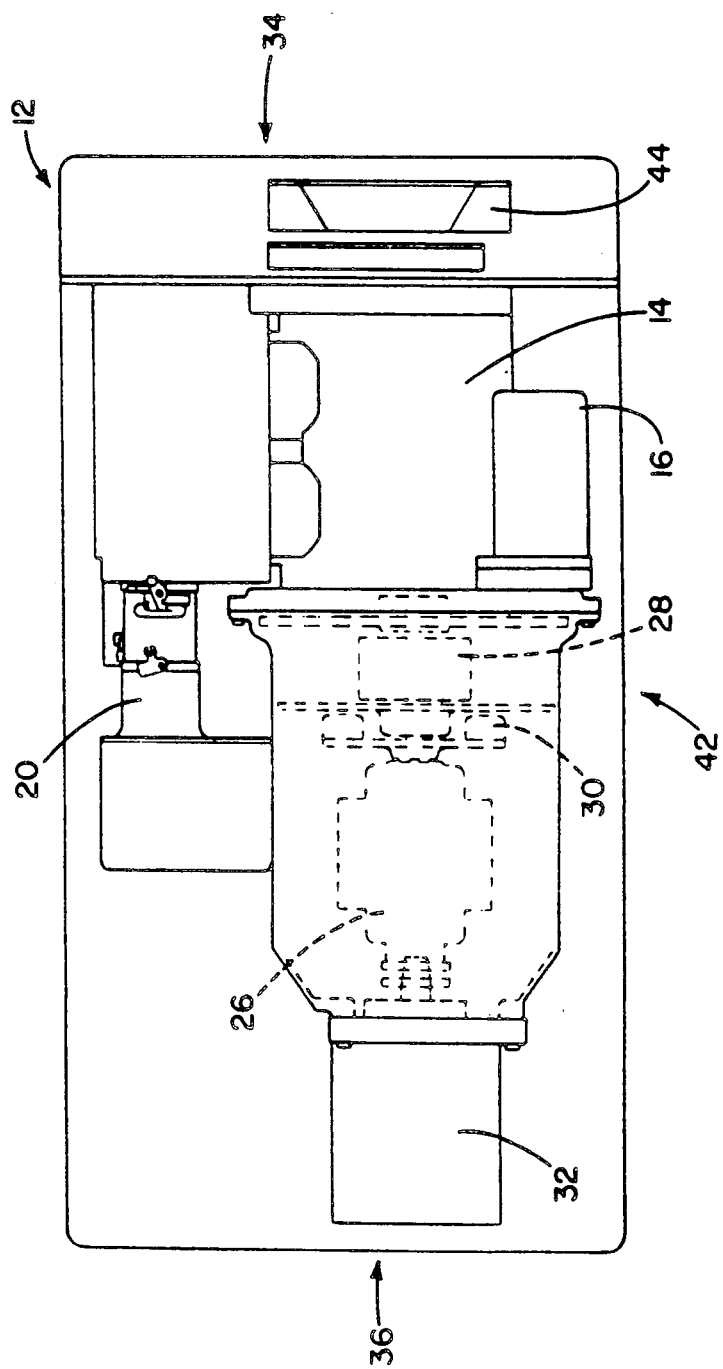
FIG. 3 shows a combined generator set and compressor according to an alternate embodiment of the present invention.

Referring now to FIG. 3, an alternate embodiment of a combined generator set and compressor 42 is shown, which uses an alternate engine cooling mechanism. This embodiment is identical to that shown in FIG. 1, except that a radial flow fan 44 is provided to cool the engine 14. The fan 44 is belt driven by the engine 14, and cools the engine 14 by pulling hot air from the engine 14 and blowing it out the right side 34 of the enclosure 12. Compressor 32 is a 100% unloading compressor, eliminating the need for a clutch between the compressor 32 and the motor-generator 26.

Figure 4:
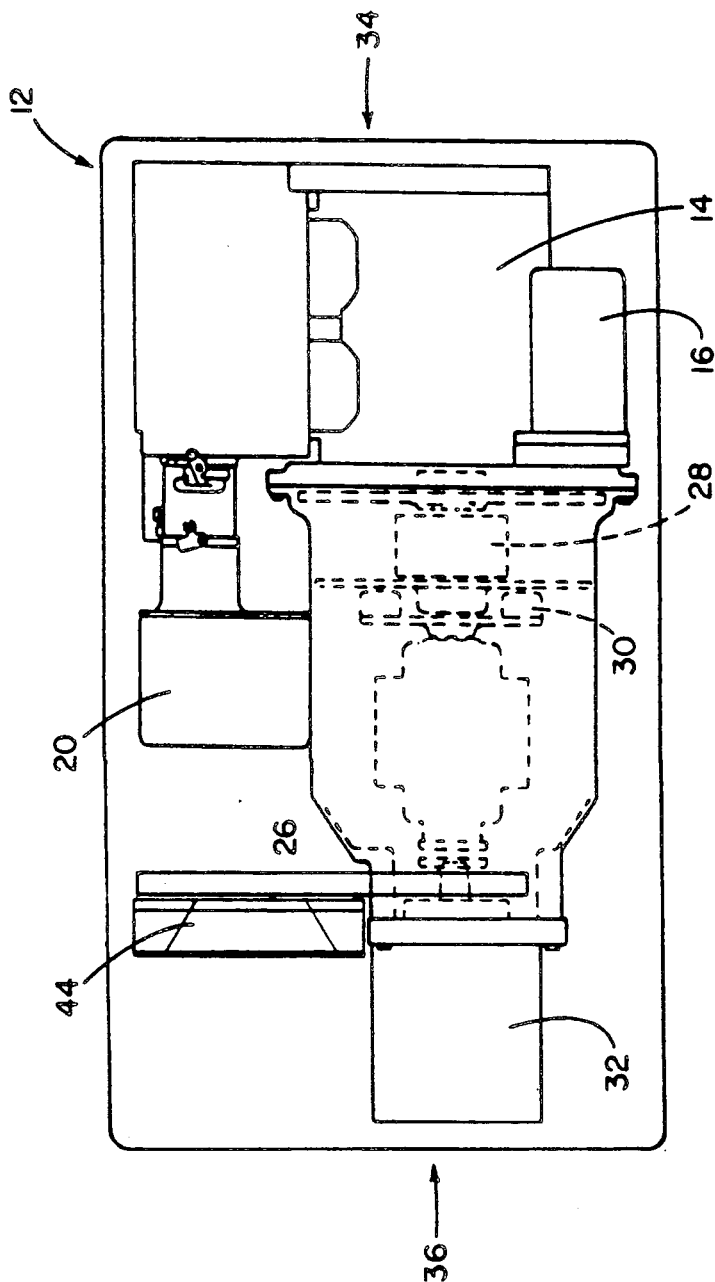
FIG. 4 shows a combined generator set and compressor according to an alternate embodiment of the present invention.

Referring now to FIG. 4, an alternate embodiment of a combined generator set and compressor 46 is shown, in which the radial flow fan 44 is positioned near the left side 36 of the enclosure 12. In this position, cooling occurs when the fan 44 draws cool air from the left side 36 which is then directed over the engine 14. Compressor 32 is a 100% unloading compressor.

Those skilled in the art will recognize that various types of compressors and fans may be combined in a generator set and compressor without departing from the scope of the invention. These variations include unloading and non-unloading compressors, various mechanical connections between the engine, the motor-generator, and the compressor including shaft drive and belt drive, and various types of fans which can be belt, shaft, electrically, or otherwise driven by the engine or motor-generator.

The use of an electromechanical machine both as a motor and as a generator is generally known in the art. There are two most likely types of machines to choose from, induction and synchronous.

Referring now to FIG. 5, a cross section of a typical induction machine for use as a motor-generator according to an embodiment of the present invention is shown. Induction machines are generally used as motors, but can also be used as generators. The rotor winding is closed upon itself, and consists of a bar in each rotor slot 48, with all bars shorted together at each end. The main winding appears in the armature slots 50. To operate as a generator, a capacitor is placed across the main winding, and the shaft 52 is driven by an auxiliary engine. The value of the capacitor depends upon the desired output voltage and regulation. The frequency of the generated electricity is determined by the speed of the engine driving the generator.

Referring now to FIG. 6, a cross section of a typical synchronous machine for use as a motor-generator according to an embodiment of the present invention is shown. Synchronous machines are generally used as generators, but can also be used as motors. The synchronous machine has a main winding appearing in the armature slots and field winding 54. When operated as a motor, AC is supplied to the armature winding and DC to the field winding 54. The speed of rotation is determined by the frequency of the AC applied to the armature winding. The synchronous machine also has an amortisseur winding which is similar to the rotor winding shown in the induction machine of FIG. 5 in that it consists of bars shorted together at each end. During starting of the synchronous motor, the field winding 54 is shorted, and the armature winding and the amortisseur winding produce an induction motor effect so as to accelerate the motor. When it has accelerated sufficiently, the short across the field winding is removed, and DC is applied.

Those skilled in the art will recognize that many variations are possible without departing form the scope of the present invention. These variations may include other types of machines, cylindrical or salient pole machines, multi-phase machines, axial flux machines, DC motor-generators, and synchronous reluctance machines.

It is to be understood that even though numerous characteristics and advantages of various embodiments of the present invention have been set forth in the foregoing description, this disclosure is illustrative only and changes may be made in detail to the full extent indicated by the broad general meaning of the terms in which the appended claims are expressed.

What is claimed is:

1. A mobile vehicle comprising:
   (a) a vehicle body;
   (b) an electrical generating system disposed on the vehicle body comprising:
     (i) an engine;
     (ii) a motor-generator unit capable of functioning as a generator for generating alternating current for the mobile vehicle when mechanically driven, the motor-generating unit further capable of functioning as a motor when connected to a source of alternating current external to the mobile vehicle;
     (iii) first connection means for connecting the motor-generator unit to the engine so as to permit the motor-generator unit to be mechanically driven by the engine; the first connection means including first clutch means for engaging the engine and the motor-generator unit when the engine is operating and alternating current produced by the motor-generator unit is desired, the first clutch means disengaging the engine and the motor-generator unit when operation of the motor-generator unit as a motor is desired; and
   (c) an air cooling system disposed on the vehicle body comprising:
     (i) a mechanically driven air conditioner;
     (ii) second connection means for connecting the air conditioner to the motor-generator unit so as to be mechanically driven by the motor during operation of the motor-generator unit as a motor, the second connection means further connecting the air conditioner to the engine so as to be mechanically driven by the engine during operation of the motor-generator unit as a generator.

2. A mobile vehicle according to claim 1, further comprising a second clutch means disposed between the motor-generator unit and the air conditioner for selectably engaging the motor-generator and the air conditioner when air conditioning is desired.

3. A mobile vehicle according to claim 1, wherein the air conditioner includes an unloading compressor.

4. A mobile vehicle according to claim 1, further comprising a first fan means for cooling the motor-generator unit.

5. A mobile vehicle according to claim 4, further comprising a second fan means for cooling the engine.

6. A mobile vehicle according to claim 1, wherein the engine, the motor-generator, and the air conditioner are aligned substantially linearly, with the motor-generator being located between the engine and the air conditioner.

7. A mobile vehicle according to claim 1, further comprising a first fan means for cooling the engine.

8. A mobile vehicle according to claim 7, wherein the first fan means is located so as to push cool air toward the engine.

9. A mobile vehicle according to claim 7, wherein the first fan means is located so as to pull hot air away from the engine.

10. A mobile vehicle according to claim 1, wherein the air conditioner is shaft driven by the motor-generator unit.

11. A mobile vehicle according to claim 1, wherein the air conditioner is belt driven by the motor-generator unit.

12. The motor vehicle according to claim 1, further comprising an enclosure defining a substantially enclosed interior, the air conditioner including a compressor mechanically driven during operation of the motor-generator unit as a generator or as a motor, and the engine, the motor-generator unit, the first connection means, the compressor and the second connection means located substantially within the interior of the enclosure.

13. A mobile vehicle having an integral air cooling and electrical generating unit, the integral air cooling and electrical generating unit comprising:
   (a) an engine;
   (b) a motor-generator capable of functioning as a motor when connected to an electrical supply external of the mobile vehicle and as a generator to produce current when mechanically driven, the motor-generator being connectable to the engine so as to be mechanically driven by the engine;
   (c) clutch means for engaging the engine with the motor-generator when the engine is operated and current produced by the motor-generator unit is desired, the clutch means disengaging the engine and the motor-generator when operation of the motor-generator unit as a motor is desired;
   (d) means for connecting the motor-generator to an electrical supply external to the mobile vehicle so as to operate the motor-generator as a motor;
   (e) an air conditioner compressor mechanically driven by the motor-generator when the motor-generator is functioning as a motor, the air conditioner compressor mechanically driven by the engine when the motor-generator is functioning as a generator; and
   (f) an enclosure arrangement having a base portion, the engine, the motor-generator, and the air conditioner compressor being supported by the base portion, the enclosure arrangement defining a substantially enclosed interior wherein the engine, the motor-generator, and the air conditioner compressor are located substantially within the interior of the arrangement, whereby an enclosed integral air cooling and electrical generating unit is provided which produces cool air for the mobile vehicle when the engine is operated or when the electrical supply external to the mobile vehicle is provided.

14. A mobile vehicle having an air cooling and electrical generating system the air cooling and electrical generating system comprising:
   (a) an engine;
   (b) a motor-generator capable of functioning as a motor when connected to a shore power source of alternating current external to the mobile vehicle and as a generator for generating alternating current when mechanically driven, the motor-generator being connectable to the engine so as to be mechanically driven by the engine;

(c) clutch means disposed between the engine and the motor-generator for engaging the engine and the motor-generator when the engine is operated and current produced by the motor-generator is desired, and the clutch means disengaging the engine and the motor-generator when a shore power source of alternating current external to the mobile vehicle is provided;

(d) means for connecting the motor-generator to a shore power source of alternating current external to the mobile vehicle so as to operate the motor-generator as a motor; and (e) an air conditioner connected to the motor-generator when the motor-generator is functioning as a motor, the air conditioner connected to the engine when the motor-generator is functioning as generator.

15. A method of cooling air and generating current in a mobile vehicle comprising the steps of:

(a) providing a mechanically driven air conditioner, an engine, and a motor-generator unit on a mobile vehicle;

(b) providing clutch means to connect the motor-generator unit to the engine such that the engine mechanically drives the motor-generator unit to produce alternating current, and connecting the engine to the air conditioner such that the engine further mechanically drives the air conditioner;

(c) operating the engine to mechanically drive the air conditioner to produce cool air for use in the mobile vehicle and to mechanically drive the motor-generator unit to produce alternating current for use in the mobile vehicle;

(d) disconnecting the engine from the motor-generator unit when a source of alternating current external of the mobile vehicle is provided;

(e) connecting the motor-generator unit to the air conditioner such that the motor-generator unit mechanically drives the air conditioner when the motor-generator unit is supplied with alternating current and functions as a motor;

(f) supplying the motor-generator unit with the source of alternating current external of the mobile vehicle to mechanically drive the air conditioner; and (g) operating the motor-generator unit as a motor to mechanically drive the air conditioner to produce cool air for use in the mobile vehicle.

* * * * *

UNITED STATES PATENT AND TRADEMARK OFFICE
CERTIFICATE OF CORRECTION

PATENT NO. :   5,125,236

DATED      :   June 30, 1992

INVENTOR(S) :  Stephen M. Clancey et al.

It is certified that error appears in the above-identified patent and that said Letters Patent is hereby corrected as shown below:

On the Title page, Inventor information

DELETE "Moundview" and INSERT therefor
--Moundsview--.

Front page of patent - Related Information U.S. Application Data
DELETE "Sep. 29" and INSERT therefor --Sept. 24--.

Signed and Sealed this

Second Day of November, 1993

Attest:

BRUCE LEHMAN

Attesting Officer          Commissioner of Patents and Trademarks